US006142645A

United States Patent [19]

Han

[11] Patent Number: 6,142,645

[45] Date of Patent: Nov. 7, 2000

[54] SKYLIGHT SYSTEM

[76] Inventor: Mike Han, 426 S. Rosemead Blvd., Pasadena, Calif. 91107

[21] Appl. No.: 09/357,107

[22] Filed: Jul. 19, 1999

[51] Int. Cl.[7] .................... B60Q 3/02

[52] U.S. Cl. .................... 362/147; 362/149; 362/150; 362/96; 362/580; 362/576; 362/355; 362/148

[58] Field of Search .................... 362/149, 150, 362/94, 580, 576, 355, 148

[56] References Cited

U.S. PATENT DOCUMENTS

| | | | |
|---|---|---|---|
| 2,885,948 | 5/1959 | Oshins . | |
| 2,924,165 | 2/1960 | Doherty . | |
| 2,997,132 | 8/1961 | Allander et al. . | |
| 3,064,548 | 11/1962 | Field | 362/147 |
| 3,085,490 | 4/1963 | Field | 362/147 |
| 3,113,728 | 12/1963 | Boyd . | |
| 3,839,949 | 10/1974 | Gobel | 98/42 |
| 4,114,186 | 9/1978 | Dominguez | 362/147 |
| 5,528,471 | 6/1996 | Green | 362/147 |
| 5,918,972 | 6/1999 | Van Belle | 362/480 |

*Primary Examiner*—Alan Cariaso
*Assistant Examiner*—Anabel M. Ton
*Attorney, Agent, or Firm*—John K. Park; Park & Sutton LLP

[57] ABSTRACT

A skylight system for use in the ceiling of a room in a structure having a roof. The skylight system includes a frame having a skylight opening and a ventilator opening, the frame being adapted for mounting to said ceiling; a light conduit having a proximal end attached to the skylight opening of the frame, and a distal end for mounting to said roof for guiding natural light from the roof to the skylight opening for naturally lighting the room; and a venting duct having a proximal end attached to the ventilator opening of the frame and a distal end for mounting to said roof for ventilating the room. The skylight system can also include a lighting fixture attached to a lighting opening in the frame for artificially lighting the room.

20 Claims, 3 Drawing Sheets

SKYLIGHT SYSTEM

FIELD OF THE INVENTION

The present invention relates to interior lighting, and more particular to interior lighting using skylights.

BACKGROUND OF THE INVENTION

Many structures such as buildings and homes include rooms which require lighting. Many rooms include lighting fixtures including a lighting source for artificially lighting the room as desired. The lighting fixtures are generally electrically powered, and such can be costly to operate. As such, natural lighting by allowing natural light from exterior of a room to enter the room is desirable to reduce energy consumption. Further, natural lighting is more pleasant to the eye and is generally diffuse.

Skylights have been utilized to provide ambient or natural lighting through the ceiling of rooms in structured having roofs. Conventional skylights include a duct extending from a opening in the ceiling of the room to an opening in the roof of the structure where the room resides, to allow natural light from the sun to enter the room. Some skylights include an exterior door for regulating the amount of light entering the skylight duct. However, although conventional sky lights provide natural lighting in rooms, as natural lighting diminishes, such as at the end of the day or on cloudy days, auxiliary lighting fixtures must be utilized to light the room. However, such auxiliary lighting fixture requires additional purchase and installation costs. Further, existing skylights do not provide any means of ventilating a room.

There is, therefore, a need for a skylight system to provide lighting to a room as desired, and to also provide ventilation.

BRIEF SUMMARY OF THE INVENTION

The present invention satisfies these needs. In one embodiment, the present invention provides a skylight system for use in the ceiling of a room in a structure having a roof. The skylight system comprises a frame having a skylight opening and a ventilator opening, the frame being adapted for mounting to said ceiling; a light conduit having a proximal end attached to the skylight opening of the frame, and a distal end for mounting to said roof for guiding natural light from the roof to the skylight opening for naturally lighting the room; and a venting duct having a proximal end attached to the ventilator opening of the frame and a distal end for mounting to said roof for ventilating the room.

The skylight system can further include a light diffuser covering at least a portion of said skylight opening of the frame. The light conduit can extend upwardly from the frame through said roof and terminate above the roof. In that case, the distal end of the light conduit has a collar for securing the distal end of the light conduit to the roof. The skylight system can also include a light admitting panel at said distal end of the light conduit. Further, the skylight system can include an exhaust fan for forcing gases through said venting duct.

To provide artificial lighting, in another embodiment the skylight system further includes a lighting fixture attached to a lighting opening in the frame for artificially lighting the room. A switch means can be used for turning an electrically powered light source in said light fixture on and off as desired.

BRIEF DESCRIPTION OF THE DRAWINGS

These and other features, aspects and advantages of the present invention will become understood with reference to the following description, appended claims and accompanying where:

DETAILED DESCRIPTION OF THE INVENTION

Figure 1:
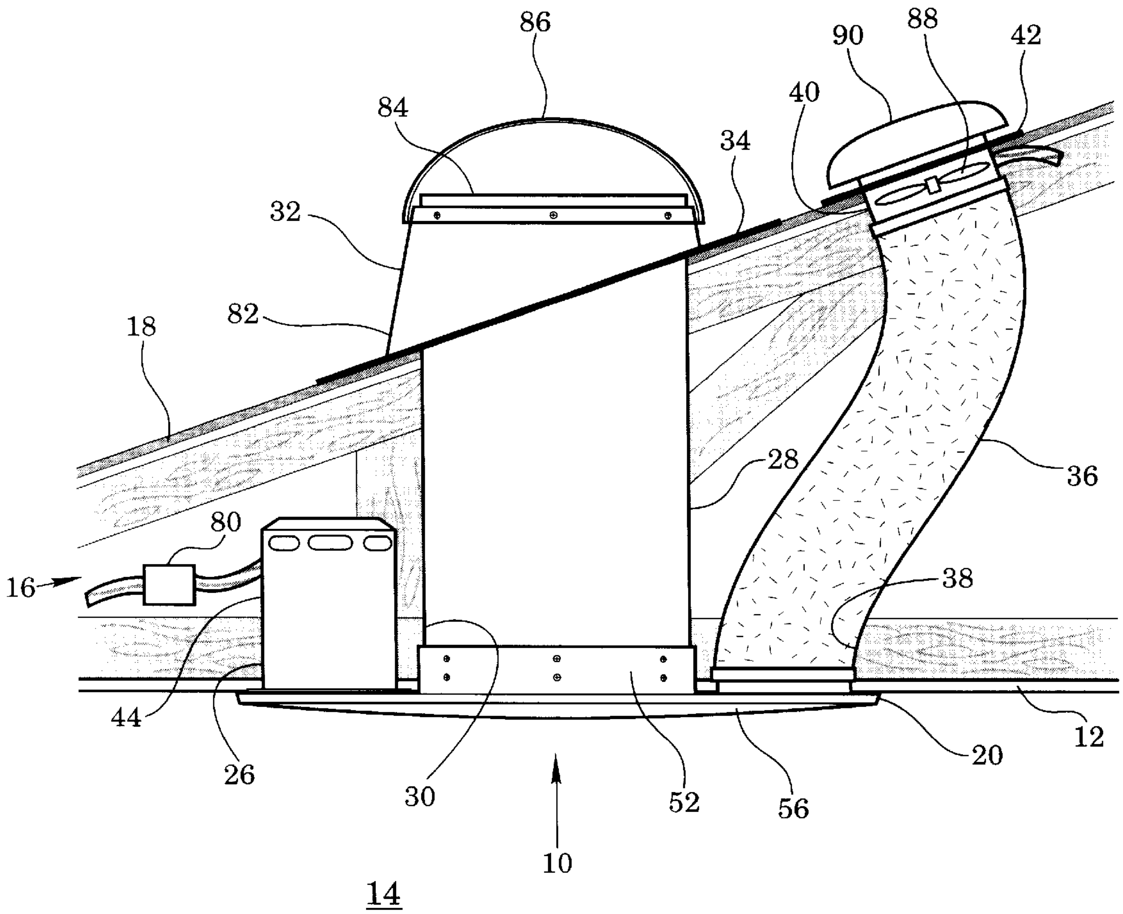
FIG. 1 shows a side elevation view of an embodiment of a skylight system according to the present invention as mounted in a structure having a ceiling and a roof.

Referring to FIG. 1, in one embodiment the present invention provides a skylight system 10 for use in the ceiling 12 of a room 14 in a structure 16 having a roof 18. The skylight system 10 includes a frame 20 having a skylight opening 22 and a ventilator opening 24, and the frame 20 is adapted for mounting to an opening 26 in the ceiling 12. The frame 20 can be made from materials such as injection molded plastic, can be generally rectangular from about 24 inches to about 30 inches long, and from about 12 inches to about 16 inches wide. The skylight opening 22 of the frame 20 can have a radius from about 10 inches to about 13 inches, and the ventilator opening 24 can have a radius from about 5 inches to about 7 inches. To provide natural lighting, the skylight system 10 further includes a light conduit 28 having a proximal end 32 attached to the skylight opening 22 of the frame 20, and a distal end 32 for mounting to an opening 34 in the roof 18 for guiding natural light to the skylight opening 22 for naturally lighting the room 14. The light conduit 28 can be made from materials such as aluminum or tin, can have an inner radius from about 10 inches to about 13 inches, and can be from about 6 inches to about 240 inches long.

To provide ventilation, the skylight system 10 further includes a venting duct 36 having a proximal end 38 attached to the ventilator opening 24 of the frame 20 and a distal end 40 for mounting to roof opening 42 for ventilating the room 14. The venting duct 36 can be made from materials such as common household flexible duct. The venting duct 36 can have an inner radius from about 5 inches to about 7 inches, and can be from about 6 inches to about 240 inches long. Further, to provide artificial lighting, the skylight system 10 can further include a lighting fixture 44 attached to a lighting opening 46 in the frame 20 for artificially lighting the room. The lighting opening 46 can have a radius from about 5 inches to about 7 inches.

Figure 2:
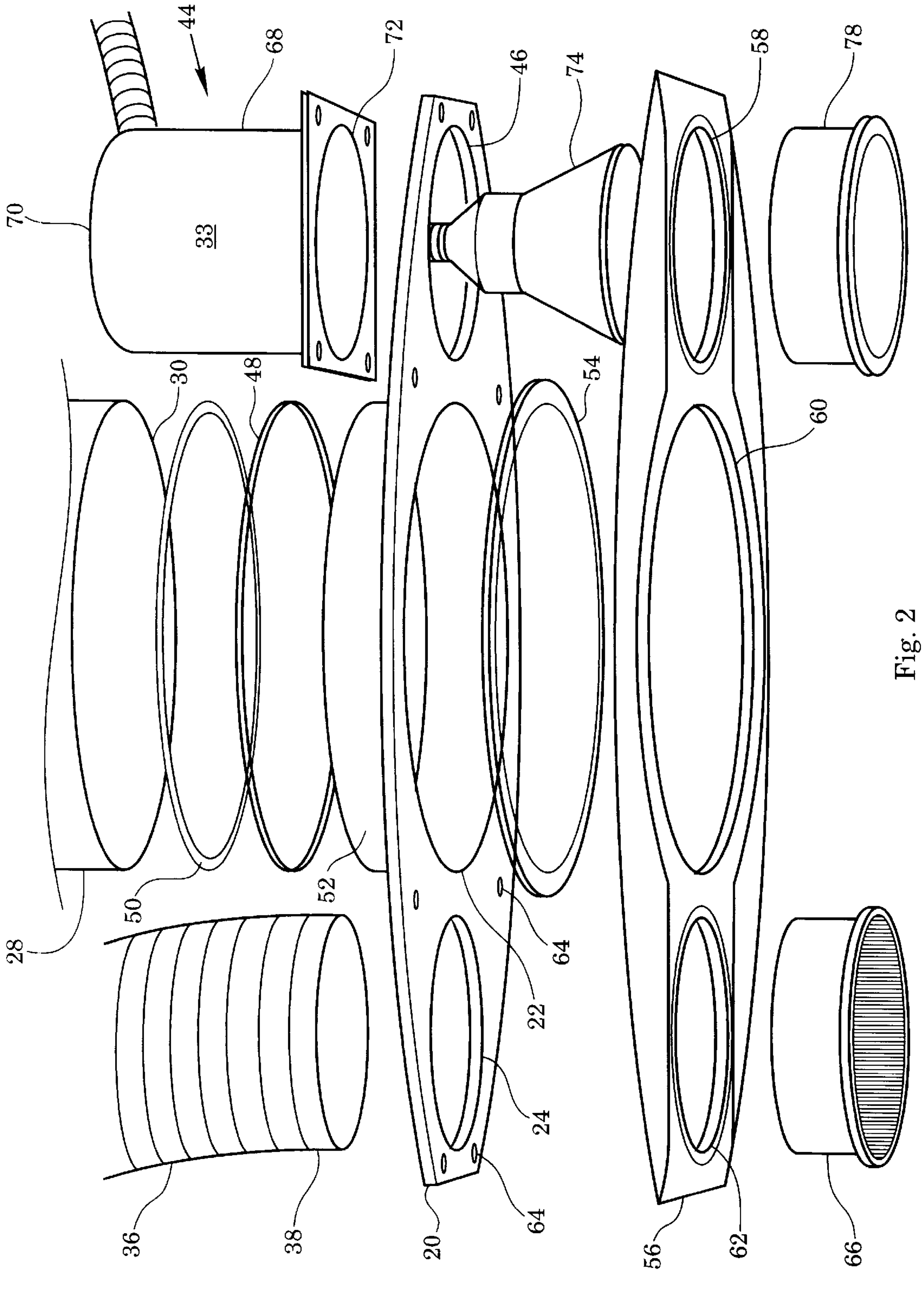
FIG. 2 shows an exploded perspective view of an embodiment of a portion of the skylight system of FIG. 1.
Figure 3:
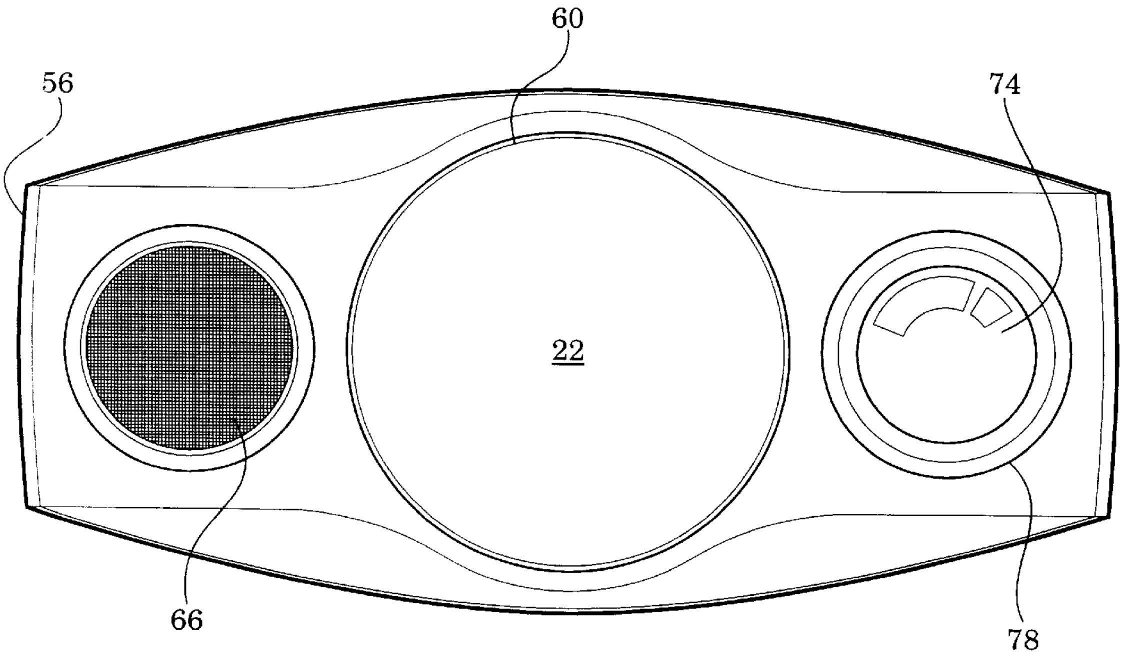
FIG. 3 shows a plan view of a portion of skylight system of FIG. 2.

Referring to FIG. 2, the proximal end 30 of the light conduit 28 is attached to the skylight opening 22 of the frame 20 by placing a transparent insulating plate 48 and a gasket 50 between the proximal end 30 of the light conduit 28 and an anchoring collar 52 around the skylight opening 22. The insulating plate 48 can be made from materials such as plexiglass or acrylic, and can be from about 0.1 inch to about 0.3 inch thick. The gasket 50 can be made from materials such as soft foam. The insulating plate 48, the gasket 52 and the anchoring collar 52 are sized and shaped to fit within the proximal end 30 of the light conduit 28 which comprises a hollow tube having a substantially circular cross-section. The light conduit 28 can have a rectangular or other shapes in cross-section. A diffuser 54 is then placed on the frame 20 covering at least a portion of said skylight opening 22, and an outer rim plate 56 having three openings 58, 60, 62 of the size, shape and placement corresponding to the openings 46, 22, 24 of the frame 20, respectively, is attached over the frame 20 facing the room 14 to hold the diffuser 54 in place against the skylight opening 22 of the frame 20. The diffuser 54 can be made from materials such as opaque acrylic, and can be from about 0.1 inch to about 0.3 inch thick. The frame 20 includes holes 64 for attachment to the ceiling 12 via screws and for attaching the outer rim plate 56 to the frame 20 via screws. The outer rim plate 56 can be made from materials such as injection molded plastic or aluminum. FIG. 3 shows a plan view of the outer rim plate 56 inside the room 14.

Referring back to FIG. 2, the proximal end 38 of the venting duct 36 is attached to the frame 20, and an exhaust grill insert 66 is shaped and sized to snugly fit within the openings 62 in the outer rim plate 56, and optionally into the opening 24 of the frame 20, and into the proximal end 38 of the venting duct 36.

The lighting fixture 33 comprises a housing 68 having a closed end 70 and an open end 72 for receiving and housing a light source such as a light bulb 74 therein. The housing 68 can be made from materials such as sheet metal, and can be dimensioned based on the physical size of the light bulb 74 to be housed therein. The open end 72 of the housing 68 is about the same size as the light opening 46 of the frame 20, and the housing 68 is attached to the lighting opening 46 of the frame 20 at said open end 72 via screws to allow light from the light bulb 74 to exit the housing 68 and pass through the lighting opening 46 of the frame 20 to illuminate the room 14. Electrical wires are provided to the housing through a cable conduit 76 attached to a side opening in the housing 68 for providing electrical power to the light bulb 74 therein. The outer rim plate 56 is attached over the frame 20 and optionally a light housing trim insert 78 shaped and sized to snugly fit into the outer rim plate opening 58, and optionally into the frame lighting opening 46 and the open end 72 of the housing 68, is inserted therein.

Further, a switch means 80 is provided between the light bulb 74 and a power source for turning power to the light bulb 74 on and off. The switch means 80 can include current or voltage controller for controlling flow of electricity to the light bulb 74 to adjust the amount of light provided by the light bulb 74. The switch means 80 can include a sensor for sensing the level of natural lighting, and for providing input signals to said controllers for automatically controlling flow of electricity to the light bulb 74 to adjust the amount of light provided by the light bulb 74 depending on the level of natural lighting. The sensor can comprise a light sensor positioned to sense the level of natural lighting, such that as the level of natural lighting diminishes, e.g., at the end of the day or on cloudy days, the sensor sends signals to said controllers to turn the light bulb 74 on or gradually increase power to the light bulb 74. And, as the level of natural lighting increases, e.g., at the beginning of the day, the sensor sends signals to said controllers to turn off, or decrease, power to the light bulb 74 to eliminate or reduce artificial lighting. Further, power to the light bulb 74 can be controller by a timer in said switch means 80 programmed to automatically turn the light bulb 74 on and off at desired times.

As shown in FIG. 1, the light conduit 28 extends upwardly from the frame 20 through an opening 34 in the roof 18 and terminates above the roof 18. The distal end 32 of the light conduit 28 has a collar 82 for securing the distal end 32 of the light conduit 28 to the roof 18. A light admitting panel 84 can be placed over the distal end 32 of the light conduit 28 to prevent fluids or cold/hot air flow though the light conduit 28. The light admitting plate 84 can be made from materials such as acrylic, can be from about 0.1 inch to about 0.3 inch thick, and can have a radius of about 10 inches to about 13 inches. Further, a canopy/door 86 can be placed over the distal end 32 of the light conduit 28. The canopy/door 86 can have means, such as an electrical motor controlled by a switch, for remotely opening the canopy/door 86.

Further, an exhaust fan 88 can be utilized for forcing gases such as air through the venting duct 36. The exhaust fan 88 can be placed within the venting duct 36 near the distal end 40 of the venting duct 36, for example. The fan 88 can be driven by an electrical motor controlled by a switch from within the room 14 for example. Further, a vent cover 90 can be placed over the distal end 40 of the venting duct 36 to allow gas flow, but prevent fluids such as rain from making its way down through the venting duct 36.

The exhaust grill insert 66 and the trim insert 78 be made exchangeable to form skylight systems 10 according to the present invention comprising said light conduit 28 and either of: (1) one venting duct 36 and one light fixture 44 as described above, (2) two venting ducts 36 of same of different types, without any lighting fixtures 44, or (3) two lighting fixtures 44 of the same or different types, without any venting ducts 36.

The present invention has been described in considerable detail with reference to certain preferred versions thereof; however, other versions are possible. Therefore, the spirit and scope of the appended claims should not be limited to the description of the preferred versions contained herein.

What is claimed is:

1. A skylight system for use in the ceiling of a room in a structure having a roof, comprising:

(a) a frame having a skylight opening and a ventilator opening, the frame being adapted for mounting to said ceiling;

(b) a light conduit having a proximal end attached to the skylight opening of the frame, and a distal end for mounting to said roof for guiding natural light from the roof to the skylight opening for naturally lighting the room; and (c) a venting duct having a proximal end attached to the ventilator opening of the frame and a distal end for mounting to said roof for ventilating the room.

2. The skylight system of claim 1 further comprising a light diffuser disposed in the path of natural light through said light conduit.

3. The skylight system of claim 1 further comprising a light diffuser covering at least a portion of said skylight opening of the frame.

4. The skylight system of claim 1, wherein the light conduit is hollow.

5. The skylight system of claim 1, wherein the light conduit extends upwardly from the frame through said roof and terminating above the roof, the distal end of the light conduit having a collar for securing the distal end of the light conduit to the roof.

6. The skylight system of claim 1 further comprising a light admitting panel at said distal end of the light conduit.

7. The skylight system of claim 1 further comprising an exhaust fan for forcing gases through said venting duct.

8. The skylight system of claim 1, wherein the frame further comprises a lighting opening, the skylight system further comprising a lighting fixture attached to the lighting opening of the frame for artificially lighting the room.

9. The skylight system of claim 8, further comprising switch means for turning an electrically powered light source in said light fixture on and off.

10. The skylight system of claim 8, wherein the switch means includes means for controlling flow of electricity to said light source to adjust the amount of light provided by said light source.

11. The skylight system of claim 10, wherein the switch means includes a sensor for sensing the level of natural lighting, and for controlling flow of electricity to said light source to adjust the amount of light provided by said light source depending on the level of natural lighting.

12. A skylight system for use in the ceiling of a room in a structure having a roof, comprising:

(a) a frame having a skylight opening and a lighting opening, the frame being adapted for mounting to said ceiling;

(b) a light conduit having a proximal end attached to the skylight opening of the frame, and a distal end for mounting to said roof for guiding natural light from the opening to the skylight opening for naturally lighting the room; and (c) a lighting opening, the skylight system further comprising a lighting fixture attached to the lighting opening of the frame for artificially lighting the room.

13. The skylight system of claim 12 further comprising a light diffuser disposed in the path of natural light through said light conduit.

14. The skylight system of claim 12 further comprising a light diffuser covering at least a portion of said skylight opening of the frame.

15. The skylight system of claim 12, wherein the light conduit is hollow.

16. The skylight system of claim 12, wherein the light conduit extends upwardly from the frame through said roof and terminating above the roof, the distal end of the light conduit having a collar for securing the distal end of the light conduit to the roof.

17. The skylight system of claim 12 further comprising a light admitting panel at said distal end of the light conduit.

18. The skylight system of claim 12, further comprising switch means for turning an electrically powered light source in said light fixture on and off.

19. The skylight system of claim 18, wherein the switch means includes means for controlling flow of electricity to said light source to adjust the amount of light provided by said light source.

20. The skylight system of claim 19, wherein the switch means includes a sensor for sensing the level of natural lighting, and for controlling flow of electricity to said light source to adjust the amount of light provided by said light source depending on the level of natural lighting.

* * * * *